(12) United States Patent
Armbruster

(10) Patent No.: US 12,474,046 B2
(45) Date of Patent: Nov. 18, 2025

(54) DEVICE FOR HEATING A MEDIUM

(71) Applicant: TRUMA GERAETETECHNIK GMBH & CO. KG, Putzbrunn (DE)

(72) Inventor: Uwe Armbruster, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 407 days.

(21) Appl. No.: 18/040,190

(22) PCT Filed: Jul. 14, 2021

(86) PCT No.: PCT/EP2021/000079
§ 371 (c)(1),
(2) Date: Feb. 1, 2023

(87) PCT Pub. No.: WO2022/078619
PCT Pub. Date: Apr. 21, 2022

(65) Prior Publication Data
US 2023/0304659 A1    Sep. 28, 2023

(30) Foreign Application Priority Data
Oct. 12, 2020  (DE) ............... 10 2020 006 264.4

(51) Int. Cl.
*F23D 11/40*    (2006.01)
*F23M 9/10*     (2006.01)
*F24H 9/00*     (2022.01)

(52) U.S. Cl.
CPC ............. *F23D 11/404* (2013.01); *F23M 9/10* (2013.01); *F23D 2900/11401* (2013.01); *F23D 2900/11403* (2013.01); *F24H 9/00* (2013.01)

(58) Field of Classification Search
CPC ......... F23D 11/404; F23D 2900/11401; F23D 2900/11403; F23M 9/10; F24H 9/00
(Continued)

(56) References Cited

U.S. PATENT DOCUMENTS 2,779,398 A    1/1957   Brown
4,149,842 A    4/1979   Benjamin
(Continued)

FOREIGN PATENT DOCUMENTS

DE    2139504 C3    6/1979
DE    3011249 A     1/1982
(Continued)

OTHER PUBLICATIONS

DE-3233321-A—Translation (Year: 1984).*
DE 10019890 A1—Translation (Year: 2001).*

*Primary Examiner* — Steven B McAllister
*Assistant Examiner* — Benjamin W Johnson
(74) *Attorney, Agent, or Firm* — McNees Wallace & Nurick

(57) ABSTRACT

The present disclosure relates to a device for heating a medium, including a burner unit and a flame tube, wherein the burner unit generates flue gas, wherein the flame tube has a flue gas inlet, a longitudinal axis, a casing extending along the longitudinal axis, and an end face opposite the flue gas inlet, wherein the flue gas passes from the burner unit into the flame tube via the flue gas inlet, wherein a plurality of recesses are located in the casing, and wherein the recesses have different dimensions and/or are distributed asymmetrically on the casing. The longitudinal axis is in a central plane, wherein a first side and a second side of the casing are formed by the central plane, and wherein recesses on the first side have smaller dimensions than recesses on the second side.

5 Claims, 1 Drawing Sheet

(58) Field of Classification Search
USPC ........................................................ 431/353
See application file for complete search history.

(56) References Cited

U.S. PATENT DOCUMENTS

| | | | |
|---|---|---|---|
| 4,530,658 A | | 7/1985 | Panick |
| 4,793,800 A | * | 12/1988 | Vallett .................... F23D 14/10 |
| | | | 431/328 |
| 6,085,738 A | * | 7/2000 | Robinson ................ F23D 11/10 |
| | | | 126/360.1 |
| 2006/0151623 A1 | | 7/2006 | Haefner et al. |

FOREIGN PATENT DOCUMENTS

| | | | | |
|---|---|---|---|---|
| DE | 3233321 A | * | 3/1984 | ........... B60H 1/2212 |
| DE | 3233321 C2 | | 8/1986 | |
| DE | 4339045 A1 | | 5/1995 | |
| DE | 10019890 A1 | * | 10/2001 | ........... F23D 11/404 |
| DE | 10019890 C2 | | 5/2003 | |
| DE | 102006054821 A1 | | 10/2008 | |
| EP | 1681519 A2 | | 7/2006 | |
| GB | 1348868 | | 3/1974 | |

* cited by examiner

DEVICE FOR HEATING A MEDIUM

FIELD OF DISCLOSURE

The present disclosure relates to a device for heating at least one medium. The medium is, for example, air or water or any other liquid. For example, air and a liquid (e.g. water) can also be warmed up or heated.

BACKGROUND

In the prior art, air heaters are known which have a burner unit for burning an air-gas mixture, for example. The resulting flue gas transfers its thermal energy via a heat exchanger to the (room) air to be heated. Alternatively, the heat is transferred to a liquid, e.g. water. Combination devices are also known which serve both to warm up air and heat water. Furthermore, it is known that the flue gas is first guided through a flame tube, which is located inside the heat exchanger. In addition, this can lead to improved combustion with fewer pollutants. Examples of flame tubes can be found in DE 21 39 504 C3, EP 1 681 519 A2, DE 32 33 321 C2 or DE 100 19 890 C2. The flame tubes described there are open on the side facing away from the burner. A cover for the end face is disclosed in DE 10 2006 054 821 A1 or can also be taken from U.S. Pat. No. 2,779,398 A.

If the flame tube is surrounded by a heat exchanger, there is a risk of uneven heat distribution with local overheating. Depending on the use of the device, this may possibly have a negative effect on the material resistance. Furthermore, the uneven heat introduction reduces the effectiveness of the heat exchanger.

SUMMARY

The object underlying the present disclosure is to propose a device for heating at least one medium, the flame tube of which leads to an improvement with respect to the prior art in terms of heat distribution.

The object is achieved by the present disclosure by means of a device for heating a medium, comprising a burner unit and a flame tube, wherein the burner unit generates flue gas, wherein the flame tube has a flue gas inlet, a longitudinal axis, a casing extending along the longitudinal axis, and an end face opposite the flue gas inlet, wherein the flue gas passes from the burner unit into the flame tube via the flue gas inlet, wherein a plurality of recesses is located in the casing, wherein the recesses have different dimensions and/or are distributed asymmetrically on the casing, wherein the longitudinal axis of the flame tube is in a central plane, wherein a first side and a second side of the casing are formed by the central plane, and wherein recesses on the first side have smaller dimensions than recesses on the second side. In the casing, and thus on the side of the flame tube, there are recesses which are optimized in terms of size and position for a uniform heat distribution or a suitable discharge of the flue gas from the flame tube. A target criterion for optimization is a flow pattern that is distributed as evenly as possible. Furthermore, an asymmetrical distribution of the recesses is given at least with regard to their dimensions, i.e. with regard to their opening or average areas. The larger recesses are located on one side of the casing are, and the smaller recesses on the other side.

It has been found that the flue gas generally takes the path which is as short as possible in terms of optimized flow. Therefore, in one configuration, the recesses are designed and arranged such that a geometrically longer path, starting from the flue gas inlet, is accompanied by larger dimensions and therefore larger opening areas. The dimensions of the recesses thus increase in the direction away from the burner unit. In this configuration, conversely, the recesses which are closer to the burner unit therefore have smaller dimensions and thus smaller opening areas.

In one configuration, the flame tube is surrounded by a heat exchanger so that the shaping and distribution of the recesses is such that the flue gas flows substantially uniformly over the heat exchanger. Therefore, in one configuration, the recesses are in particular designed and arranged such that a geometrically longer path, in the direction of the flue gas exit from the heat exchanger, is associated with larger dimensions and therefore with larger opening areas. Furthermore, in one configuration, the shaping and distribution is such that a pressure loss along the flame tube is substantially constant.

In one configuration, the present disclosure relates to a burner/heat exchanger system (or to a device comprising a burner unit and a heat exchanger) having a centrally arranged burner and a single-sided exhaust gas discharge.

In one configuration, the flame tube has a cylindrical shape having a circular or elliptical base.

In one embodiment, the flame tube of the device is arranged horizontally. The first side having the smaller recesses is above the second side having the larger recesses along the force of gravity. The flue gas, which thus rises upwards, passes through narrower recesses than the flue gas which leaves the flame tube at a lower level.

One configuration provides that the device further comprises a flue gas outlet and that the flue gas passes from the flame tube to the flue gas outlet. In one configuration, the flue gas outlet is located above the flame tube against the force of gravity. In particular, a one-sided exhaust gas conduction is realized via the flue gas outlet. In one configuration, the flue gas outlet is located along a longitudinal side of the flame tube or the heat exchanger. In one configuration, the flue gas outlet is located more in the direction of the height (relative to the longitudinal axis of the flame tube) of the burner unit than at the height of the end face of the flame tube.

In one configuration, the flame tube is located horizontally in a housing. In this configuration, the flame tube is located in a housing.

One configuration consists in that recesses on a side of the casing facing the flue gas outlet have smaller dimensions than recesses on a side facing away from the flue gas outlet. The flue gas, which thus takes a geometrically shorter path from the interior of the flame tube to the flue gas outlet, passes through smaller recesses than the proportion of the flue gas which initially moves away from the flue gas outlet, and therefore also experiences correspondingly less draw in the direction of the outlet.

One configuration provides that a majority of the recesses is located in a section of the casing which is small relative to an overall length of the casing. In this configuration, the recesses or at least a majority of the recesses gather on a section along the longitudinal axis which is small relative to the overall length. In one configuration, the section is less than half the total length and in another configuration, the section is one third or one quarter of the total length.

One configuration consists in that the recesses are located in an area between a last third and a last quarter of the casing along the longitudinal axis in front of the end face. In this configuration, the recesses (or at least a majority thereof) is located in a rear end of the flame tube facing away from the burner unit. This has the advantage that the combustion reagents in the flame are significantly more or even completely converted. This reduces the exhaust gas values with regard to pollutants such as CO, NOx or unburned hydrocarbons.

One configuration consists in that the end face is at least partially or completely closed. In this configuration, the flue gas can leave the flame tube only to a small extent—in the case of a partial closure—or not at all—in the case of a complete closure—through the end face. This is in contrast to a flame tube open on an end face, as is known in the prior art.

One configuration provides that the recesses are substantially circular holes or (elongated) slots.

One configuration consists in that the device further comprises a heat exchanger and that the flame tube is at least partially located in the heat exchanger. Depending on the configuration, the heat exchanger has substantially the basic shape of a cylinder or cone on the inner side facing the flame tube. Depending on the configuration, the flame tube is arranged concentrically or eccentrically in the heat exchanger.

In one configuration, the heat exchanger has a substantially uniform inner profile in which the flame tube is located. In one configuration, the flame tube is arranged centrally in the heat exchanger.

In one configuration, the flue gas outlet is located on a longitudinal side of the heat exchanger.

In one configuration, the heat exchanger extends substantially in a horizontal direction.

One configuration consists in that the burner unit is for the combustion of a fuel-air mixture. The fuel is, for example, gas or a suitably prepared liquid fuel, such as diesel or gasoline.

BRIEF DESCRIPTION OF DRAWINGS

In detail, there are a multitude of possibilities for designing and further developing the device according to the present disclosure. For this purpose, reference is made on the one hand to the claims subordinate to claim 1, and on the other hand to the following description of example embodiments in connection with the drawing, in which:

DETAIL DESCRIPTION OF EXAMPLE EMBODIMENTS

Figure 1:
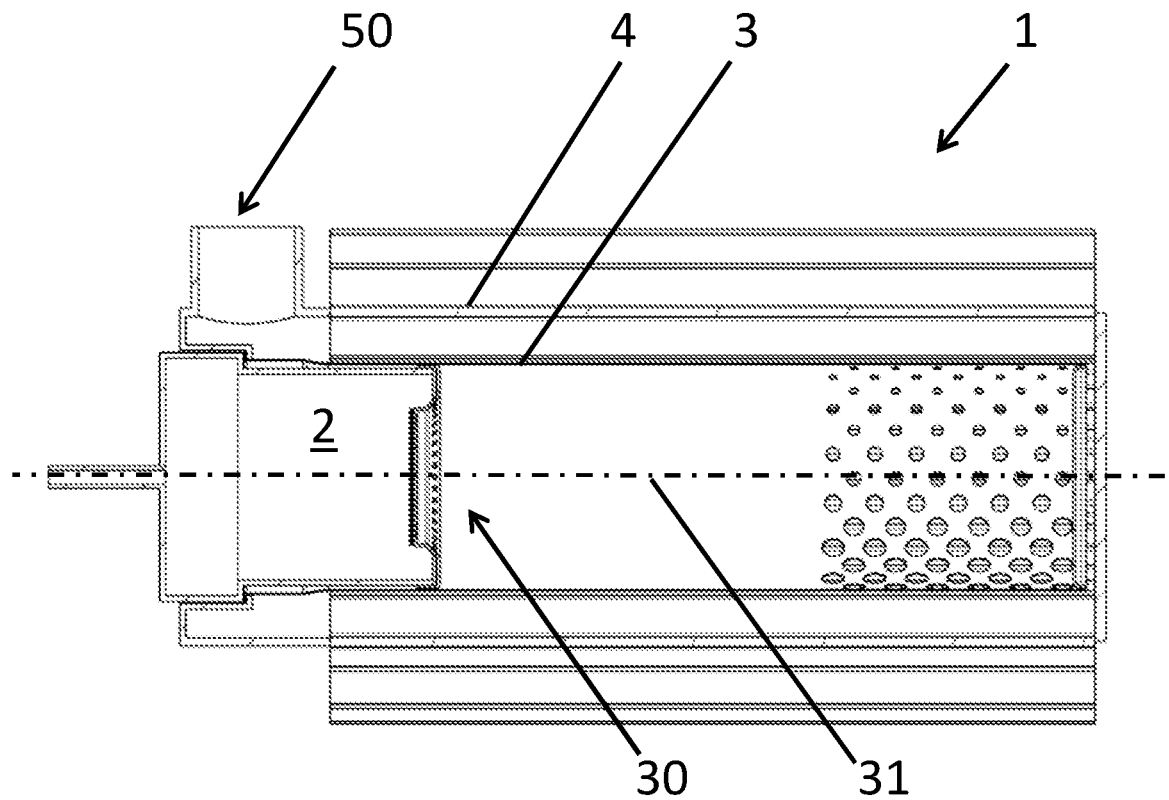
FIG. 1 shows a section through a schematic representation of the device.

FIG. 1 schematically shows a device 1 for heating air and water. For this purpose, a fuel-air mixture is burned in the burner unit 2, the fuel being, for example, a gas. The resulting flue gas passes via the flame tube 3 and the recesses 34, 34' (cf. FIG. 2) into the interior of the heat exchanger 4 and from there to the flue gas outlet 50, which is connected, for example, to a chimney—not shown here. The flue gas flows horizontally through the flame tube 3 from the flue gas inlet 30. Thus, the longitudinal axis 31 of the flame tube 3 is horizontal. The heat exchanger 4 is designed to be circular cylindrical. The surrounding units in relation to guiding the air or water to be heated are not shown for reasons of clarity.

Figure 2:
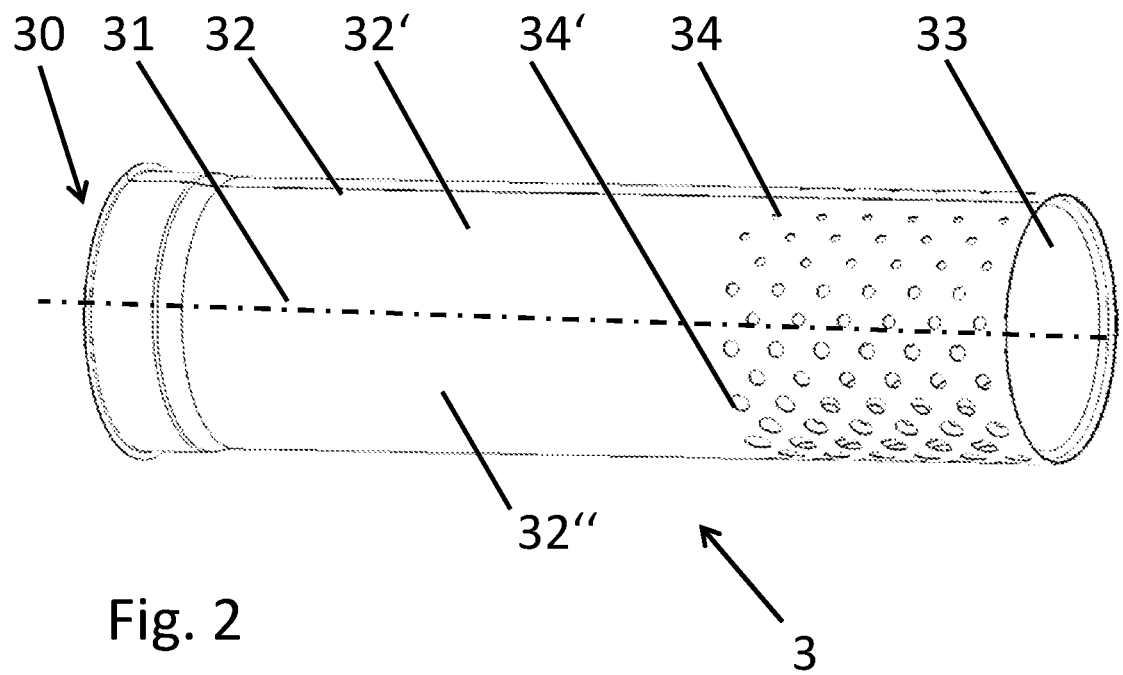
FIG. 2 shows a spatial representation of the flame tube.

The flame tube 3 is shown in FIG. 2. It has a casing 32 which extends along the longitudinal axis 31 and an end face 33 which is completely closed in the variant shown. The flue gas can thus only escape through the recesses 34, 34' in the casing 32. As can be seen, the recesses 34, 34' are here located in the end of the flame tube 3 facing away from the flue gas inlet 30 or towards the end face 33. The flue gas must therefore pass through the flame tube 3 over a longer distance. This enables a more complete conversion of the combustion reagents, so that less harmful substances are produced and discharged.

In the embodiment shown, the recesses 34, 34' are configured as circular holes having different diameters. Due to the horizontal positioning of the flame tube 3 in the device, the casing 32 of the flame tube 3 has a first 32' (or upper) side and a second (or lower) side 32". Since (cf. FIG. 1) the flue gas outlet 50 is located above the flame tube 3 and also due to the thermal buoyancy, the fluidically shorter path for the flue gas is in the direction of the upper side 32'. Recesses 34 having smaller dimensions are located on the upper side 32', such that smaller opening areas are also produced there. The recesses 34' having larger dimensions are located on the lower side 32". Therefore, the flue gas is discharged there from the flame tube 3 after a longer flow path via larger cross-sections.

LIST OF REFERENCE NUMERALS

1 Device
2 Burner unit
3 Flame tube
4 Heat exchanger
30 Flue gas inlet
31 Longitudinal axis
32 Casing
32', 32" Side of the casing
33 End face
34, 34' Recess
50 Flue gas outlet

The invention claimed is:

1. A device for heating a medium, comprising:
a burner unit and a flame tube,
wherein the burner unit generates flue gas,
wherein the flame tube has a flue gas inlet, a longitudinal axis, a casing extending along the longitudinal axis, and an end face opposite the flue gas inlet,
wherein the flue gas passes from the burner unit into the flame tube via the flue gas inlet, wherein a plurality of recesses are located in the casing that are divided into a first set of recesses and a second set of recesses
wherein the flame tube is horizontally arranged,
wherein the longitudinal axis is in a central plane, wherein a first side and a second side of the casing are formed by the central plane such that the first side is arranged above the second side,
wherein the first set of recesses are disposed on the first side and the second set of recesses are disposed on the second side, and
wherein the recesses have different dimensions and are asymmetrically distributed on the casing, such that the first set of recesses disposed on the first side have smaller dimensions than the second set of recesses disposed on the second side.

2. The device according to claim 1,
wherein the device further has a flue gas outlet, and
wherein the flue gas passes from the flame tube to the flue gas outlet.

3. The device according to claim 1,
wherein a majority of the recesses is located in a portion of the casing which is small relative to an overall length of the casing, and
wherein the recesses are located between a last third and a last quarter of the casing in front of the end face.

4. The device according to claim 1,
wherein the end face is partially or completely closed.

5. The device according to claim 1,
wherein the device further includes a heat exchanger, and
wherein the flame tube is at least partially located in the heat exchanger.

\* \* \* \* \*